United States Patent
Viswanathan et al.

(10) Patent No.: US 10,299,113 B1
(45) Date of Patent: *May 21, 2019

(54) SWITCHING MOBILE SERVICE PROVIDER USING BLOCKCHAIN

(71) Applicant: International Business Machines Corporation, Armonk, NY (US)

(72) Inventors: Ram Viswanathan, Chennai (IN); Srinivasa Raghavan Govindaswamy, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/179,927

(22) Filed: Nov. 3, 2018

Related U.S. Application Data

(63) Continuation of application No. 16/016,404, filed on Jun. 22, 2018, now Pat. No. 10,171,992.

(51) Int. Cl.
  *H04W 4/24* (2018.01)
  *H04W 8/28* (2009.01)
  *H04M 15/00* (2006.01)

(52) U.S. Cl.
  CPC ............. *H04W 8/28* (2013.01); *H04M 15/50* (2013.01); *H04W 4/24* (2013.01)

(58) Field of Classification Search
  CPC .......... H04W 8/28; H04W 4/24; H04M 15/52
  See application file for complete search history.

(56) References Cited

U.S. PATENT DOCUMENTS

| | | | |
|---|---|---|---|
| 2017/0295157 A1* | 10/2017 | Chavez | H04B 1/3816 |
| 2017/0330180 A1* | 11/2017 | Song | G06F 21/33 |
| 2018/0198624 A1* | 7/2018 | Bisti | H04L 9/3247 |
| 2018/0205725 A1* | 7/2018 | Cronkright | H04L 63/083 |

OTHER PUBLICATIONS

"A SIM-less Existence with Blockchain ID," Technovations_UAE, posted on Nov. 15, 2016, https://technovationsae.wordpress.com/2016/11/15/a-sim-less-existence-with-blockchain-id/.

"Mobile Number Portability Blockchain," ReadMe File, faizann/blockchain-mnp, github.com, Aug. 24, 2017, https://github.com/faizann/blockchain-mnp/blob/master/README.md.

Sharma, Toshendra, "Blockchain Use Cases for Telecom Industry," Blockchain Council, posted on Oct. 2, 2017, https://www.blockchain-council.org/blockchain/blockchain-use-cases-for-telecom-industry/.

Velasco-Castillo, Enrique, "Nine Blockchain Opportunities that Telcom Operators should Explore," Analysis Mason, Knowledge Centre, Jun. 13, 2016 (3 pages), http://www.analysysmason.com/Research/Content/Comments/nine-blockchain-opportunities-Jun2016-RDMY0/.

\* cited by examiner

*Primary Examiner* — Brandon J Miller

(57) ABSTRACT

An example operation may include one or more of receiving, by a mobile service provider, a mobile number portability request from a mobile device connected to a current mobile service provider; fetching mobile device porting data from a blockchain ledger accessible by the mobile service provider and by the current mobile service provider; verifying fetched mobile device porting data; in response to a successful verification, sending a request to the blockchain ledger to update current mobile service provider data; and receiving a notification from the blockchain indicating that a connection between the current mobile service provider and the mobile device is disconnected; porting a mobile device number; and updating the mobile device porting data in the blockchain ledger.

20 Claims, 9 Drawing Sheets

SWITCHING MOBILE SERVICE PROVIDER USING BLOCKCHAIN

TECHNICAL FIELD

This application generally relates to mobile communications, and more particularly, to switching mobile service provider using blockchain technology.

BACKGROUND

In today's world, most of the mobile phone users want to keep their own phone number when they change a mobile service provider (SP). Conventionally, a Number Portability service can allow a mobile user to switch the SP while keeping the same phone number. However, switching the SP while keeping the same phone number may take significant time and processing efforts due to a unique porting code used by the SP. The mobile user may explore and choose the next SP. The mobile user may have to call the SP administrators and ask them to generate a unique porting code. The paper work such as porting form(s) may be required in order to initiate the process of switching the SP. Typically, the mobile user has to exchange several SMSs with the SP administrator. Also, the mobile user may need to submit some documents including a passport size photo and an identity proof (i.e., driver license, voter ID card, etc.). The mobile device user has to pay the existing bill and make the complete payments to the SP up to the SP switch date. Only then, upon successful verification and approval, a new SIM card may be issued to the mobile user. This process generally takes up to 15 working days depending on the SP. Accordingly, the process of switching the SP needs to be more efficient. As discussed herein, conventionally, the process of switching the SP while keeping the same phone number is limited by paperwork, phone calls, SMSs, etc. As such, what is needed is an efficient and robust one-step automated process for efficient switching of the SP.

SUMMARY

This application is directed to switching mobile service provider using blockchain technology. Use of the blockchain for mobile number portability while switching the SP makes the process significantly faster, more efficient and less costly. According to exemplary embodiments, switching the SP may be reduced to an automated one-step process.

One example embodiment may provide a method that includes one or more of the following steps: receiving, by a mobile service provider, a mobile number portability request from a mobile device connected to a current mobile service provider; fetching, by the mobile service provider, mobile device porting data from a blockchain ledger accessible by the mobile service provider and by the current mobile service provider; verifying, by the mobile service provider, fetched mobile device porting data; in response to a successful verification, sending, by the mobile service provider, a request to the blockchain ledger to update current mobile service provider data; and receiving, by the mobile service provider, a notification from the blockchain indicating that a connection between the current mobile service provider and the mobile device is disconnected; porting a mobile device number, by the mobile service provider; and updating the mobile device porting data in the blockchain ledger.

Another example embodiment may provide a system that includes a processor and memory, wherein the processor is configured to perform one or more of the following: receive a mobile number portability request from a mobile device connected to a current mobile service provider; fetch mobile device porting data from a blockchain ledger accessible by the mobile service provider and by the current mobile service provider; verify fetched mobile device porting data; in response to a successful verification, send a request to the blockchain ledger to update current mobile service provider data; and receive a notification from the blockchain indicating that a connection between the current mobile service provider and the mobile device is disconnected; port a mobile device number; and update the mobile device porting data in the blockchain ledger.

A further example embodiment may provide a non-transitory computer readable medium comprising instructions, that when read by a processor, cause the processor to perform one or more of receiving a mobile number portability request from a mobile device connected to a current mobile service provider; fetching mobile device porting data from a blockchain ledger accessible by the mobile service provider and by the current mobile service provider; verifying fetched mobile device porting data; in response to a successful verification, sending a request to the blockchain ledger to update current mobile service provider data; and receiving a notification from the blockchain indicating that a connection between the current mobile service provider and the mobile device is disconnected; porting a mobile device number; and updating the mobile device porting data in the blockchain ledger.

DETAILED DESCRIPTION

Figure 1:
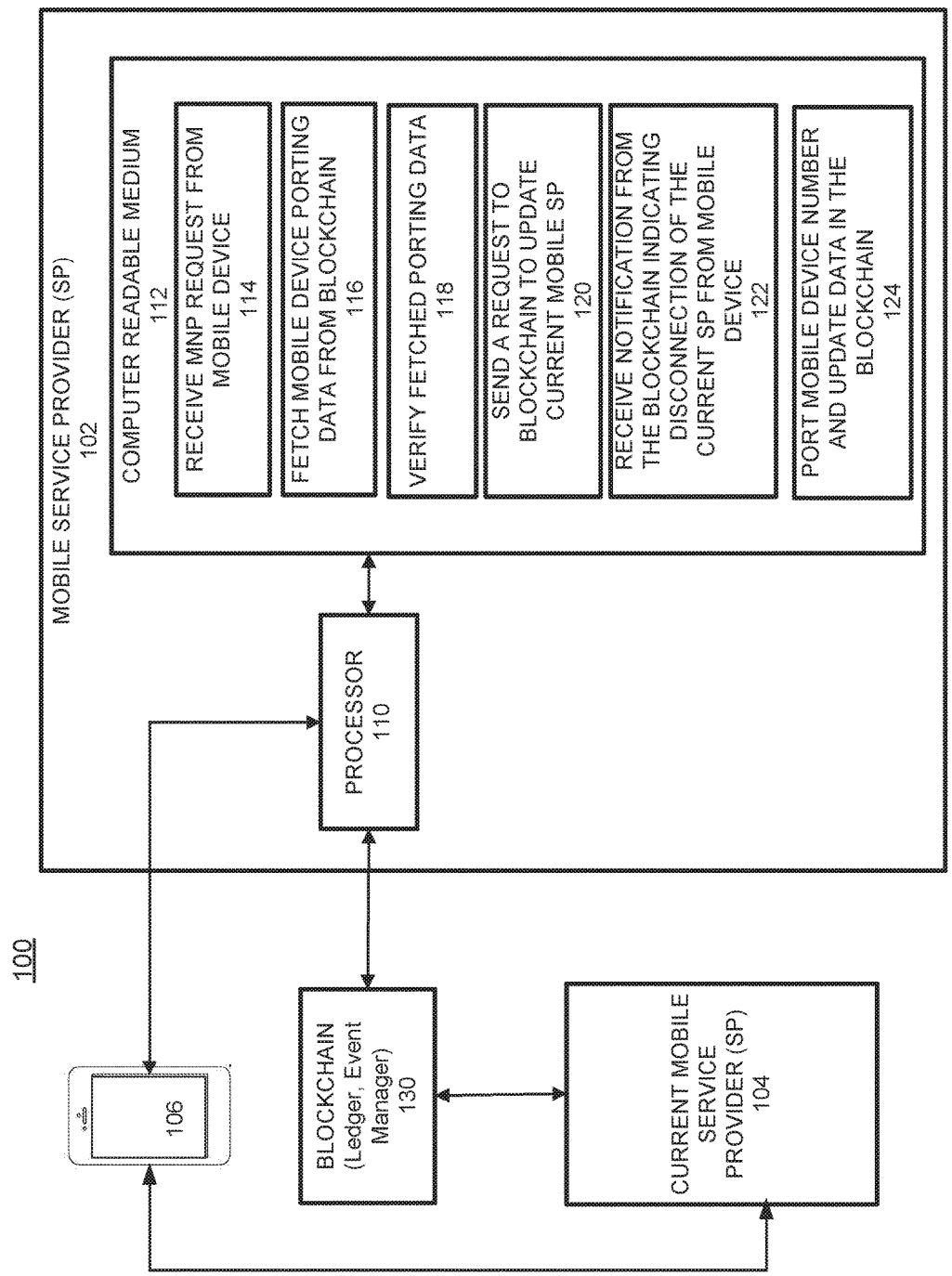
FIG. 1 illustrates a network diagram for switching mobile service provider using blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide for efficient one-step switching of mobile service provider using blockchain technology. The example embodiments provide for a mechanism to leverage blockchain to establish and enable the on-demand mobile number portability and for switching the SP through a single step without doing any documentation or any manual work.

The exemplary embodiments may use stored recorded transactions. A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to the blockchain ledger, all peers need to reach a consensus status.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Example embodiments include one or more of the followings attributes: Immutable/Accountability (blockchain ledger), Smart Contract (business validation is written in a smart contract and is validated against ledger data between new and current service providers. The smart contract also manages a state of the asset to complete the life-cycle), Privacy/Hidden (data privacy is achieved through an access control list and/or mapping user/service provider organization/role or priority), Consensus (business and other consensus are achieved through the smart contracts), Endorsements (multiple organization and peers can be on-boarded on the blockchain network with the key organizations as endorsing peers to validate the smart contract execution results, read-set and write-set), and, Accessibility (the instant solution can be built with mobile applications, browser based web applications, etc. and integrated with service provider servers, back office systems, as client applications, etc.).

The example embodiments are directed to methods, devices, networks, non-transitory computer readable media and/or systems, which support a blockchain solution for automated switching of a mobile service provider. Some of the benefits of such a solution include enabling Trust, Visibility and Provenance into the mobile provider automated switching process using a blockchain to achieve shorter processing cycle and increase efficiency of processing a mobile number portability requests. The blockchain ledger data is immutable and that provides traceability and provenance to switching SP solution. Also, use of the blockchain provides security and builds trust. The mobile service agreement validation is written in Smart Contract that validates it against ledger data between the new and the current SP. The Smart Contract also manages the state of the asset to complete the life-cycle. The example blockchains is permission decentralized. Hence, each SP may have its own ledger copy to access. Additionally, multiple Organizations (and peers) may be on-boarded on the blockchain network. The key Organizations may serve as endorsing peers to validate the smart contract execution results, read-set and write-set. The exemplary blockchain may be integrated with mobile applications, browser-based applications integrated with existing mobile service providers as client applications.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system for automated switching of the mobile service provider using a blockchain is implemented due to immutable accountability, security, privacy, permitted decentralization, availability of smart contracts, endorsements and accessibility that are inherent and unique to blockchain. In particular, the blockchain ledger data is immutable and that provides traceability and provenance to switching SP solution. Also, use of the blockchain in switching mobile SPs provides security and builds trust. The mobile service agreement validation is written in Smart Contract, which validates it against ledger data between the new and the current SP. The Smart Contract also manages the state of the asset to complete the life-cycle. The example blockchains is permission decentralized. Thus, each SP may have its own ledger copy to access. Multiple Organizations (and peers) may be on-boarded on the blockchain network. The key Organizations may serve as endorsing peers to validate the smart contract execution results, read-set and write-set. In other words, the blockchain inherent features provide for efficient automation of the mobile SP switching process.

One of the benefits of the example embodiments is an improvement of the functionality of a computing system by providing access to capabilities such as distributed ledger, peers, encryption technologies, MSP, event handling, etc. Also, the blockchain enables to create a business network and make mobile SPs to on-board for participation. As such, the blockchain is not just a database. The blockchain comes with capabilities to create a Business Network of SPs and on-board/off-board organizations (e.g., SPs) to collaborate and execute mobile service processes in the form of smart contracts.

Through the blockchain solution described herein, a computing system can perform novel functionality by providing an automated switch of the mobile SP without any manual processing. The mobile device porting data storage (posting or querying the data) is managed by the blockchain internal data handling engine which provides a novel solution to switching the SP.

The example embodiments provide numerous benefits over a traditional database. For example, various advantages are achieved by immutable accountability, security, privacy, permitted decentralization, availability of smart contracts, endorsements and accessibility that are inherent and unique to blockchain.

Meanwhile, a traditional database could not be used to implement the example embodiments because it does not bring all parties (i.e., SPs) on the business network, it does not create trusted collaboration and does not provide business validation through smart contracts.

Meanwhile, if a traditional database were used to implement the example embodiments, the example embodiments would suffer from unnecessary drawbacks such as search capability, lack of security and slow speed of transactions. Accordingly, the example embodiments provide for a specific solution to a problem in the arts/field of switching the SP by a mobile user, while keeping the same phone number.

FIG. 1 illustrates a system for switching the mobile service provider using a blockchain according to example embodiments. Referring to FIG. 1, the example network 100 includes a mobile device 106 connected to a current mobile service provider (SP) 104. The SP 104 is connected to a blockchain 130 where mobile portability data of the mobile device 106 is stored and updated. While this example shows only one mobile device, multiple mobile devices may be connected to the current mobile service provider 104. A mobile service provider 102 may be also connected to the blockchain 130 for accessing mobile device portability data.

The mobile device 106 can send a mobile number portability (MNP) request to the mobile SP 104 in order to switch to this mobile SP from the current mobile SP 104.

It should be understood that the SP 104 may include additional components and that some of the components described herein may be removed and/or modified without departing from a scope of the SP 104 disclosed herein. The SP 104 may be a computing device or a server computer, or the like, and may include a processor 110, which may be a semiconductor-based microprocessor, a central processing unit (CPU), an application specific integrated circuit (ASIC), a field-programmable gate array (FPGA), and/or another hardware device. Although a single processor 110 is depicted, it should be understood that the SP 104 may include multiple processors, multiple cores, or the like, without departing from a scope of the SP 104 system.

The SP 104 may also include a non-transitory computer readable medium 112 that may have stored thereon machine-readable instructions executable by the processor 110. Examples of the machine-readable instructions are shown as 114-124 and are further discussed below. Examples of the non-transitory computer readable medium 112 may include an electronic, magnetic, optical, or other physical storage device that contains or stores executable instructions. For example, the non-transitory computer readable medium 112 may be a Random Access memory (RAM), an Electrically Erasable Programmable Read-Only Memory (EEPROM), a hard disk, an optical disc, or other type of storage device.

The processor 110 may fetch, decode, and execute the machine-readable instructions 114 to receive a mobile number portability request from a mobile device 106 connected to the current mobile SP 104. In other words, the user of the mobile device 106 may want to switch from the current mobile SP 104 to the mobile SP 102 without changing the phone number. The processor 110 may fetch, decode, and execute the machine-readable instructions 116 to fetch mobile device 106 porting data from a blockchain 130 ledger accessible by the mobile SP 104 and by the current mobile SP 102. The processor 110 may fetch, decode, and execute the machine-readable instructions 118 to verify fetched mobile device porting data. The verification of the fetched information from the blockchain 130 can be done through invoking services from the National Security Network using the unique identifier. The confirmation may be obtained from the mobile device 106 user after successful verification. The confirmation can be obtained through a user interface linked with the blockchain 130. The processor 110 may fetch, decode, and execute the machine-readable instructions 120 to send a request to the blockchain 130 ledger to update current mobile SP 104 data in response to a successful verification. The processor 110 may fetch, decode, and execute the machine-readable instructions 122 to receive a notification from the blockchain 130 indicating that a connection between the current mobile SP 104 and the mobile device 106 is disconnected. The processor 110 may fetch, decode, and execute the machine-readable instructions 124 to port a mobile device number and to update the mobile device porting data in the blockchain 130 ledger.

Figure 2A:
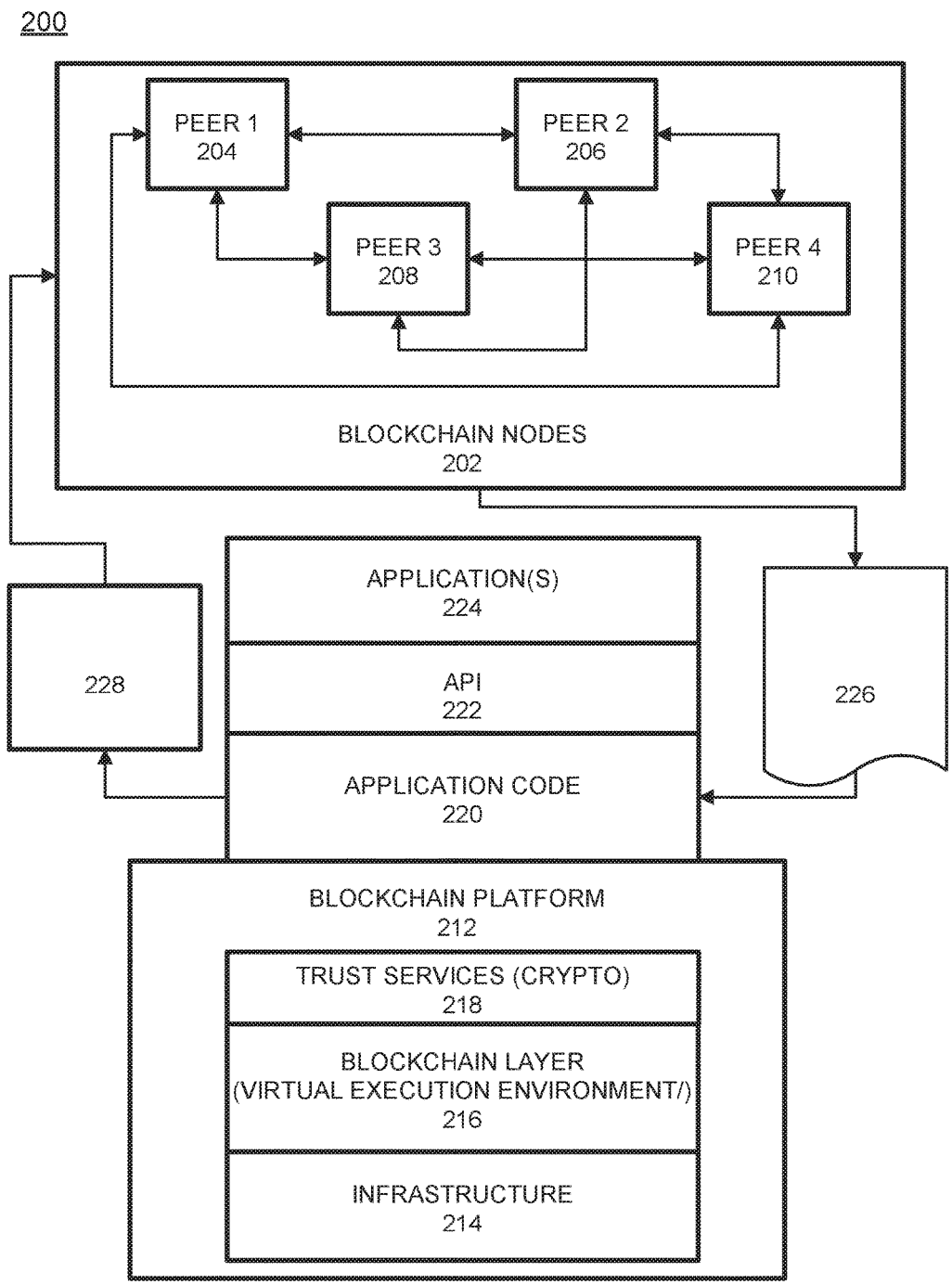
FIG. 2A illustrates an example peer node blockchain architecture configuration for switching mobile service provider, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, mobile device portability information 226 may be processed by one or more processing entities (e.g., virtual machines) included in the blockchain layer 216. The updated mobile device portability result 228 may include connection and services to a new mobile service provider. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, the update of mobile device and SP information may be implemented as a committed blockchain transaction. One function at box 228 may be to provide access to mobile device data to a new mobile service provider, which may be provided to one or more of the nodes 204-210 that may host a mobile service provider.

Figure 2B:
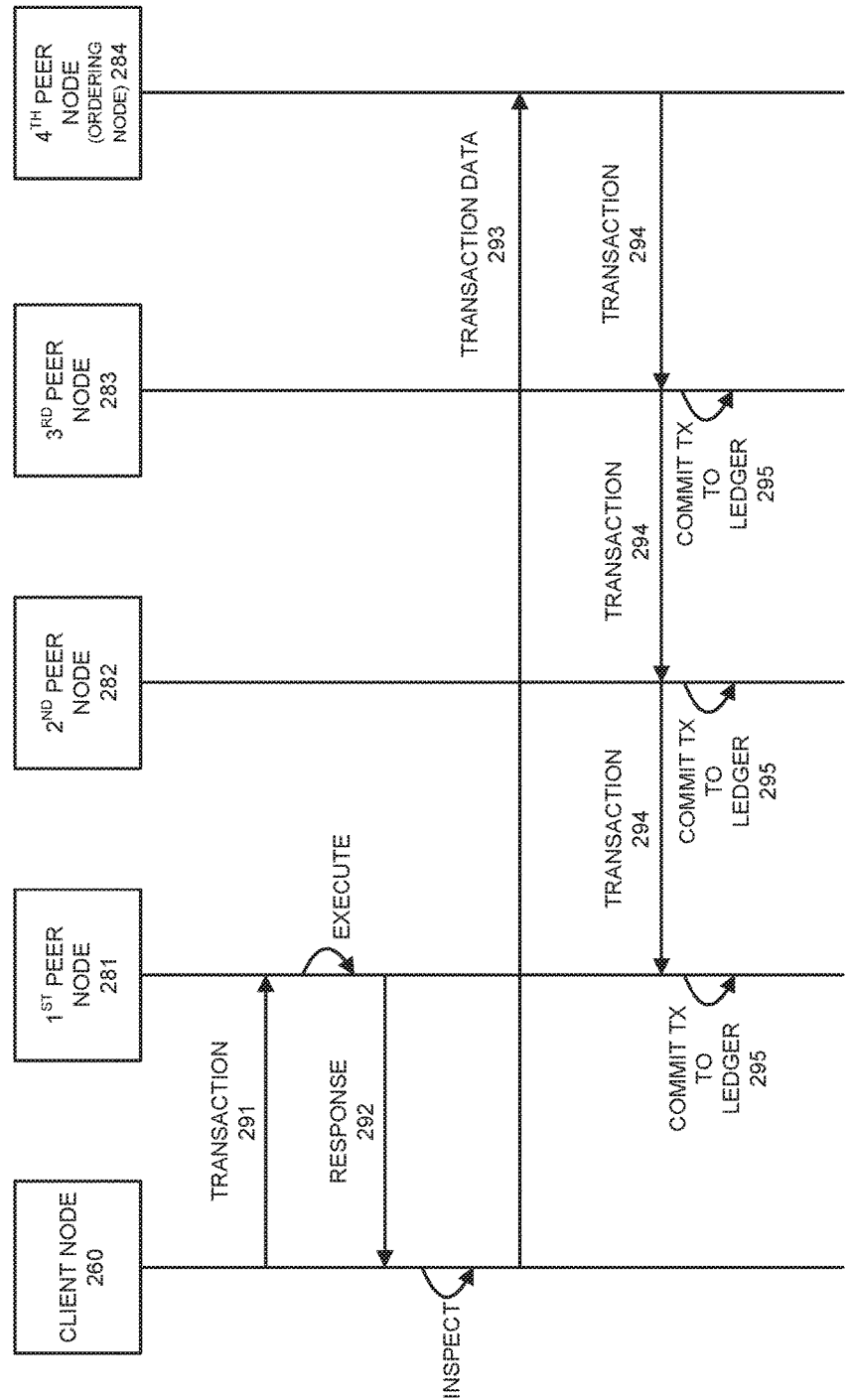
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260, which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
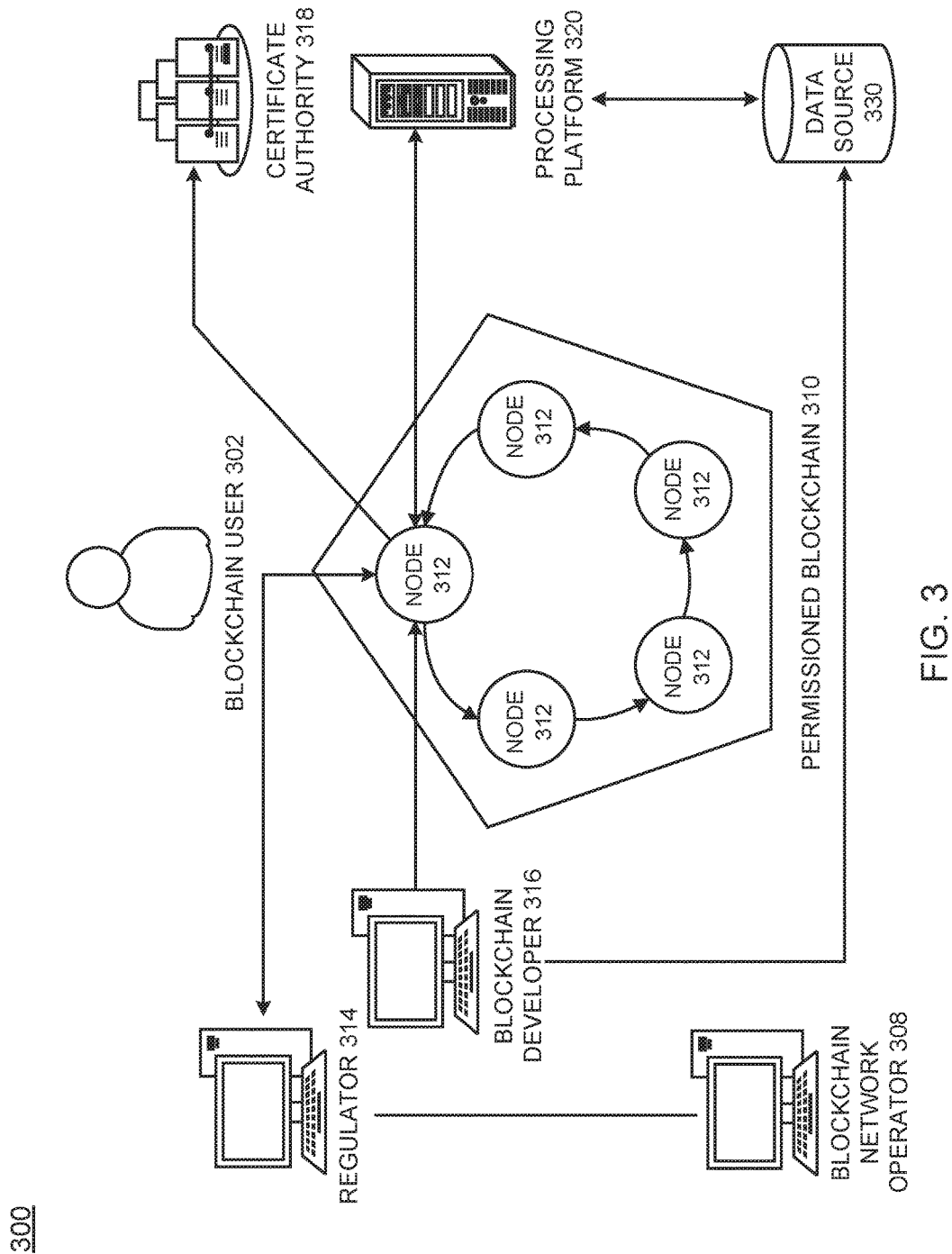
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
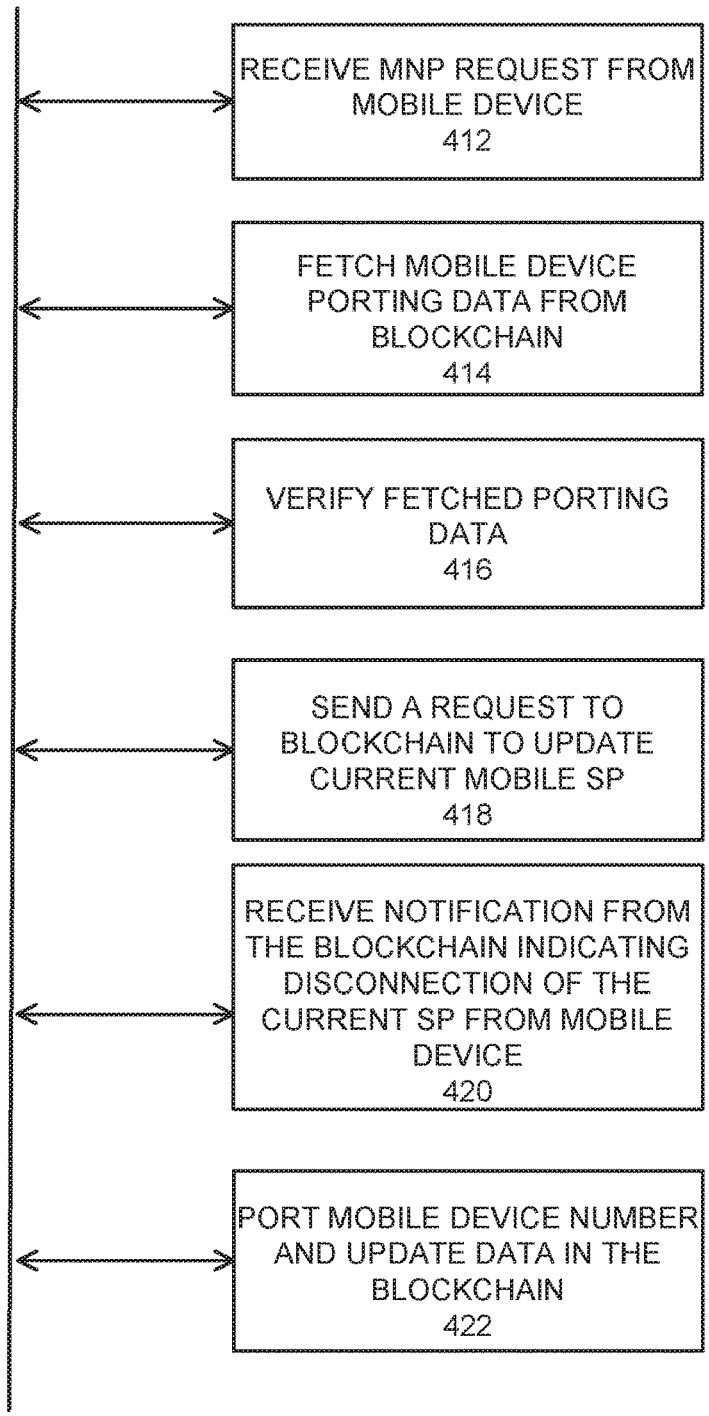
FIG. 4A illustrates a flow diagram of an example method of switching a mobile service provider using a blockchain, according to example embodiments.

FIG. 4A illustrates a flow diagram 400 of an example method of switching a mobile service provider using a blockchain, according to example embodiments. Referring to FIG. 4A, the method 400 may include one or more of the steps described below.

FIG. 4A illustrates a flow chart of a mobile SP switching method executed by the by the SP 102 (see FIG. 1). It should be understood that method 400 depicted in FIG. 4 may include additional operations and that some of the operations described therein may be removed and/or modified without departing from the scope of the method 400. The description of the method 400 is also made with reference to the features depicted in FIG. 1 for purposes of illustration. Particularly, the processor 110 of the mobile SP 102 may execute some or all of the operations included in the method 400.

With reference to FIG. 4, at block 412, the processor 110 may receive a mobile number portability request from a mobile device connected to a current mobile service provider. At block 414, the processor 110 may fetch mobile device porting data from a blockchain ledger accessible by the mobile service provider and by the current mobile service provider. At block 416, the processor 110 may verify fetched mobile device porting data. At block 418, the processor 110 may send a request to the blockchain ledger to update current mobile service provider data in response to a successful verification. At block 420, the processor 110 may receive a notification from the blockchain indicating that a connection between the current mobile service provider and the mobile device is disconnected. At block 422, the processor 110 may port a mobile device number and update the mobile device porting data in the blockchain ledger. According to exemplary embodiment, the update may be implemented as a smart contract established between the current and the new SP. After successful verification and confirmation, an event may be triggered which would execute the smart contract and make the update on the blockchain ledger.

Figure 4B:
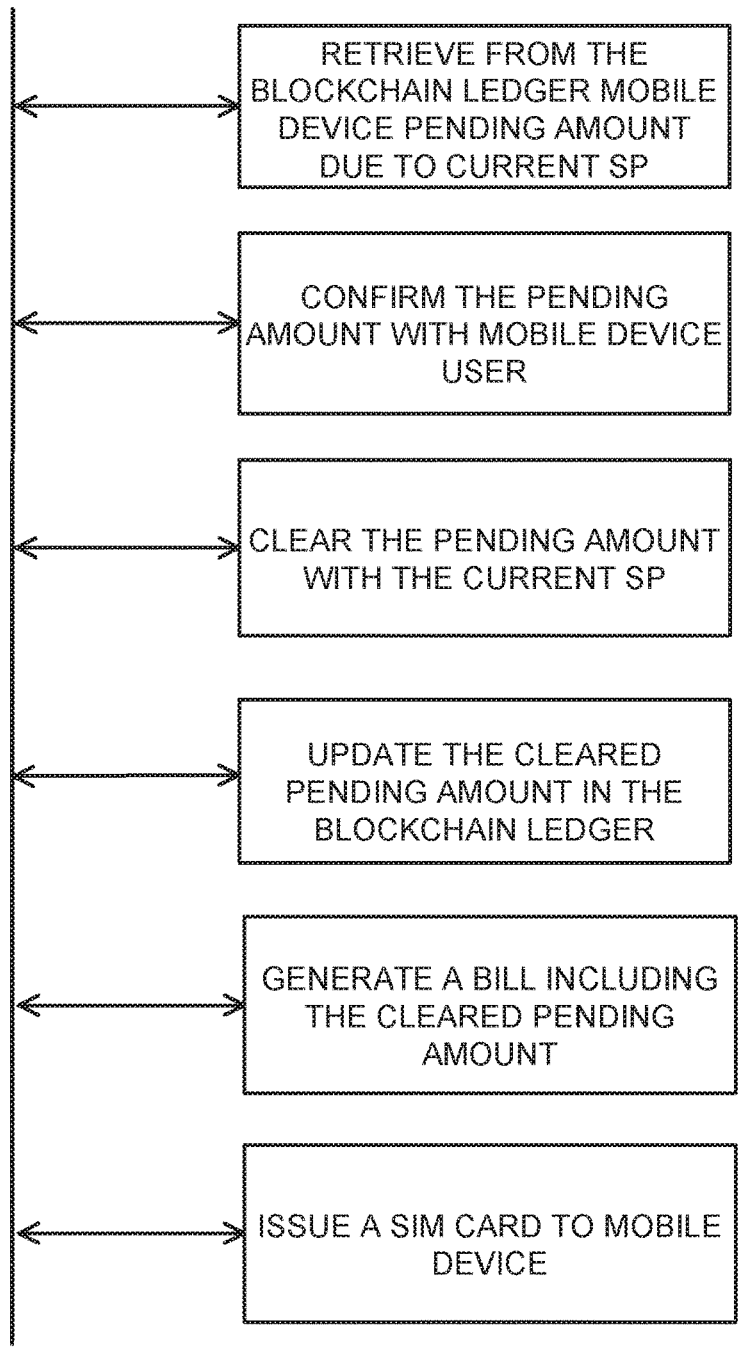
FIG. 4B illustrates a flow diagram of an example method of switching a mobile service provider using a blockchain, according to example embodiments.

FIG. 4B illustrates a flow diagram 450 of an example method of switching a mobile SP using a blockchain, according to example embodiments. Referring to FIG. 4B, the method 450 may also include one or more of the following steps. A blockchain even manager sends a trigger to the current mobile service provider to initiate disconnection from the mobile device. The event may be triggered by the event manager at the blockchain side to start the smart contract execution after successful verification and approval. The mobile SP retrieves from the blockchain ledger a mobile device pending service amount due to the current mobile provider. The mobile SP confirms the mobile device pending service amount with a mobile device user. The mobile SP, in response to a confirmation of the mobile device pending service amount, clears the mobile device pending service amount with the current mobile service provider. The mobile SP updates a cleared mobile device pending service amount in the blockchain ledger. The mobile SP generates a bill including the cleared mobile device pending service amount for the mobile device user. The mobile SP issues a SIM card to the mobile device.

Figure 5A:
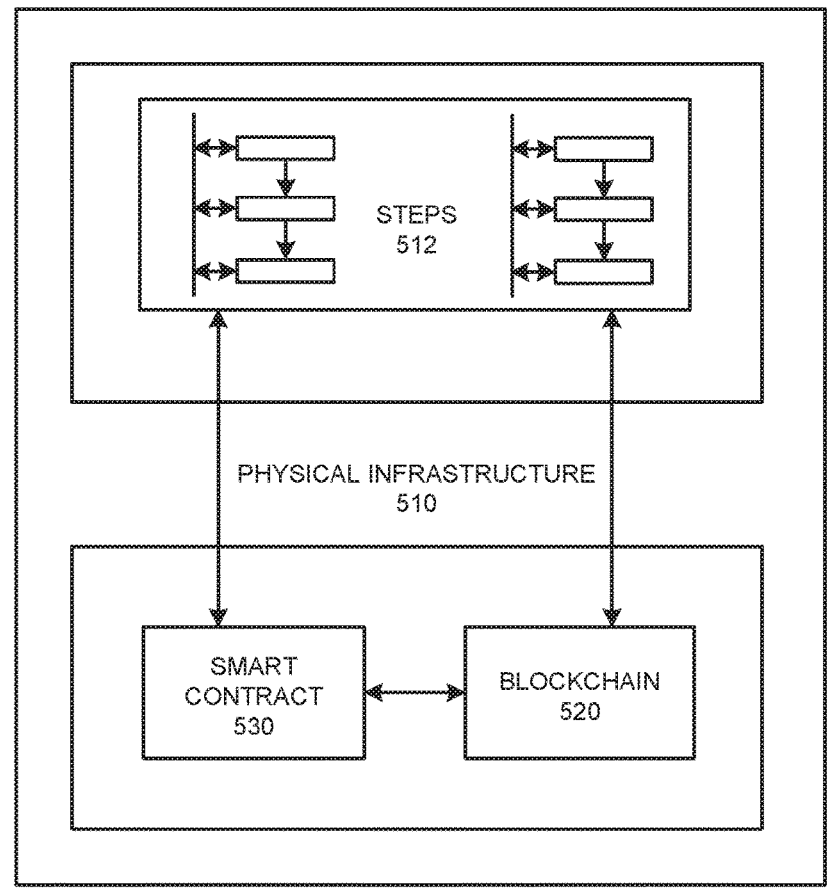
FIG. 5A illustrates an example physical infrastructure configured to perform various operations on the blockchain in accordance with one or more operations described herein, according to example embodiments.

FIG. 5A illustrates an example physical infrastructure configured to perform various operations on the blockchain in accordance with one or more of the example methods of operation according to example embodiments. Referring to FIG. 5A, the example configuration 500 includes a physical infrastructure 510 with a blockchain 520 and a smart contract 530, which may execute any of the operational steps 512 included in any of the example embodiments. The steps/operations 512 may include one or more of the steps described or depicted in one or more flow diagrams and/or logic diagrams. The steps may represent output or written information that is written or read from one or more smart contracts 530 and/or blockchains 520 that reside on the physical infrastructure 510 of a computer system configuration. The data can be output from an executed smart contract 530 and/or blockchain 520. The physical infrastructure 510 may include one or more computers, servers, processors, memories, and/or wireless communication devices.

Figure 5B:
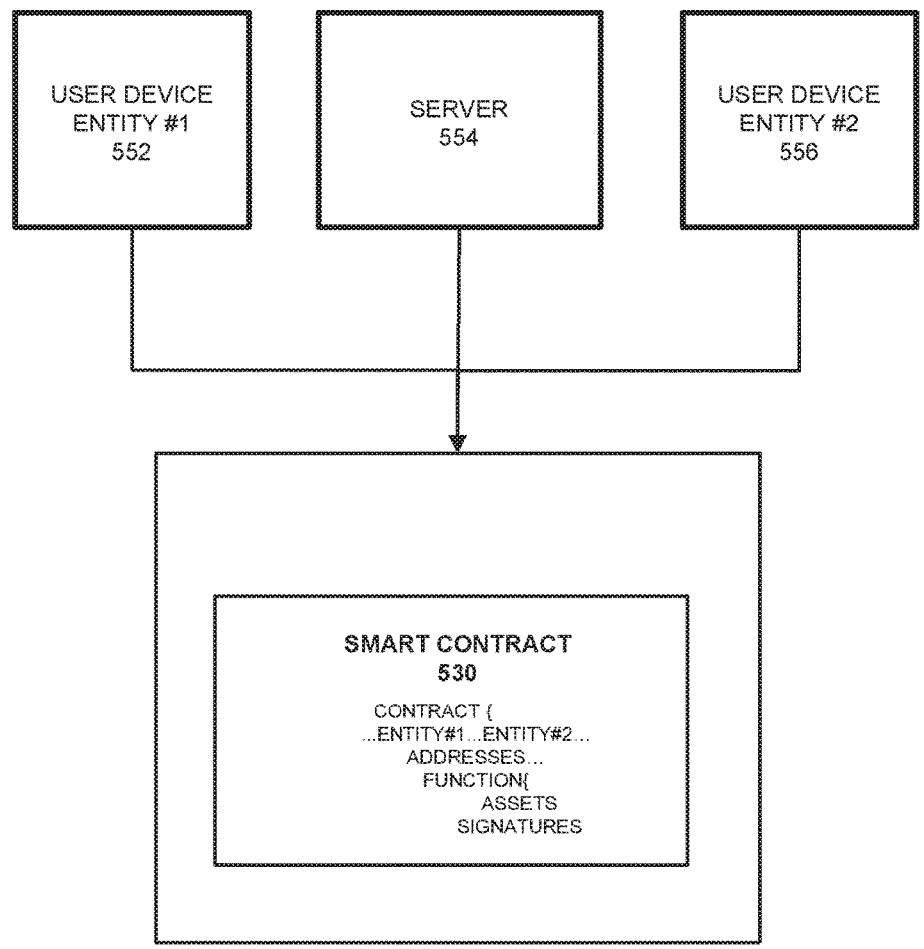
FIG. 5B illustrates an example smart contract configuration among contracting parties and a mediating server configured to enforce smart contract terms on a blockchain, according to example embodiments.

FIG. 5B illustrates an example smart contract configuration among contracting parties and a mediating server configured to enforce the smart contract terms on the blockchain according to example embodiments. Referring to FIG. 5B, the configuration 550 may represent a communication session, an asset transfer session or a process or procedure that is driven by a smart contract 530 which explicitly identifies one or more user devices 552 and/or 556. The execution, operations and results of the smart contract execution may be managed by a server 554. Content of the smart contract 630 may require digital signatures by one or more of the entities 552 and 556 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
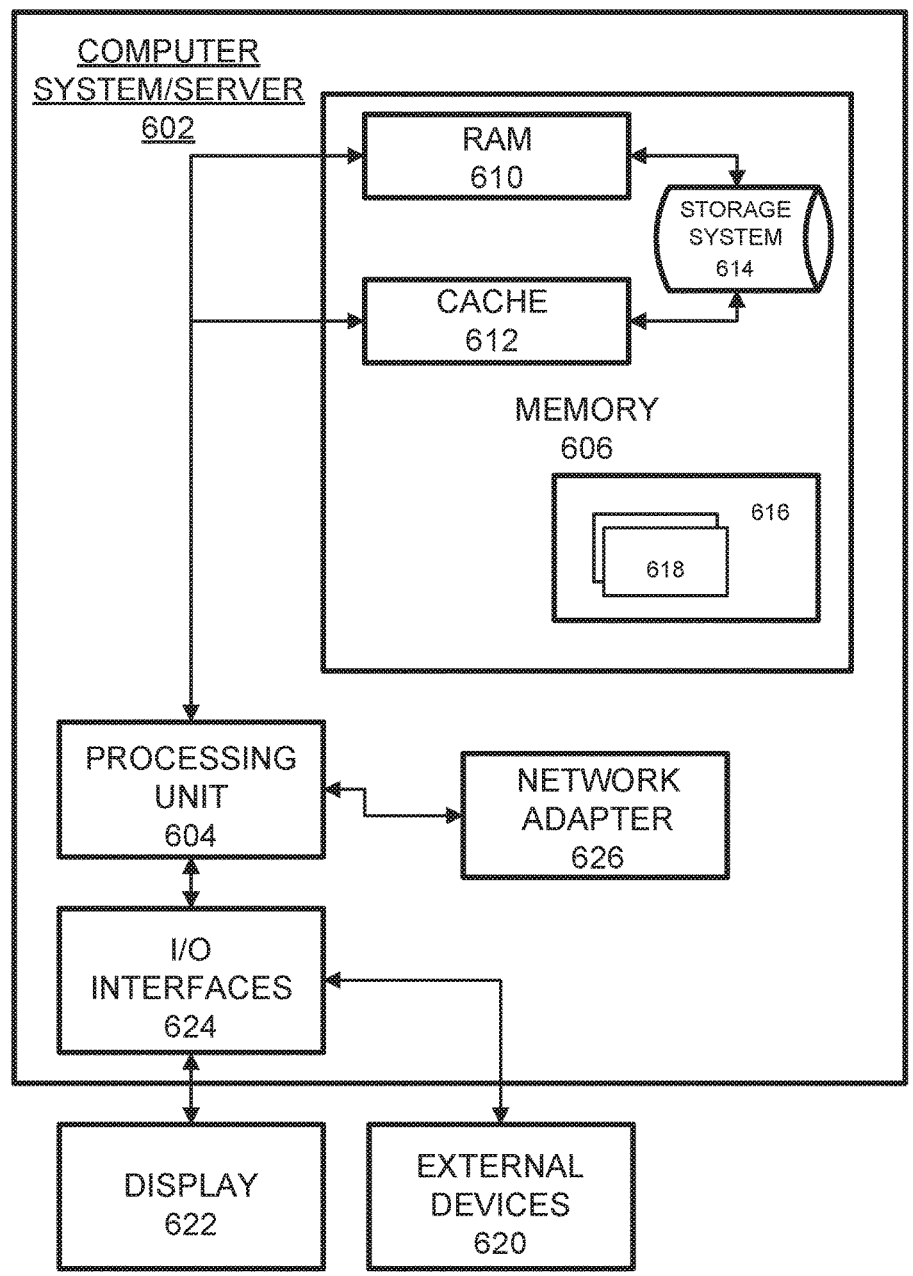
FIG. 6 illustrates an example computer system configured to support one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms, etc.) thereto.

What is claimed is:

1. A method, comprising:
   fetching, by a mobile service provider, porting data of a mobile device from a blockchain ledger accessible by the mobile service provider and by a current mobile service provider;
   sending, by the mobile service provider, a request to the blockchain ledger to update data of the current mobile service provider;
   when a notification from the blockchain ledger indicating that a connection between the current mobile service provider and the mobile device is disconnected, porting a mobile number of the mobile device, by the mobile service provider; and
   updating the porting data in the blockchain ledger.

2. The method of claim 1, wherein the sending of the request to the blockchain ledger to update current mobile service provider data further comprises sending a trigger to the current mobile service provider by an event manager of the blockchain.

3. The method of claim 1, further comprising retrieving from the blockchain ledger a pending service amount due to the current mobile provider from the mobile device.

4. The method of claim 3, further comprising confirming the pending service amount via the mobile device.

5. The method of claim 4, further comprising, in response to the confirmation of the pending service amount, clearing the pending service amount with the current mobile service provider.

6. The method of claim 5, further comprising updating the cleared pending service amount.

7. The method of claim 6, further comprising generating a bill including the cleared pending service amount for the mobile device.

8. A system, comprising:
   a processor;
   a memory on which are stored machine readable instructions that when executed by the processor, cause the processor to:
   fetch porting data of a mobile device from a blockchain ledger accessible by a mobile service provider and by a current mobile service provider;
   send a request to the blockchain ledger to update data of the current mobile service provider;
   when a notification from the blockchain ledger indicating that a connection between the current mobile service provider and the mobile device is disconnected, port the mobile number; and
   update the porting data in the blockchain ledger.

9. The system of claim 8, wherein the instructions for sending of the request to the blockchain ledger to update current mobile service provider data further comprising sending a trigger to the current mobile service provider by an event manager of the blockchain.

10. The system of claim 8, wherein the instructions are further to cause the processor to retrieve from the blockchain ledger a pending service amount due to the current mobile provider from the mobile device.

11. The system of claim 10, wherein the instructions are further to cause the processor to confirm the pending service amount via the mobile device.

12. The system of claim 11, wherein the instructions are further to cause the processor, in response to the confirmation of the pending service amount, clear the pending service amount with the current mobile service provider.

13. The system of claim 12, wherein the instructions are further to cause the processor to update the cleared pending service amount.

14. The system of claim 13, wherein the instructions are further to cause the processor to generate a bill including the cleared pending service amount for the mobile device.

15. The system of claim 8, wherein the instructions are further to cause the processor to issue a virtual SIM card to the mobile device.

16. A non-transitory computer readable medium comprising instructions, that when read by a processor, cause the processor to perform:
fetching, by a mobile service provider, porting data of a mobile device from a blockchain ledger accessible by the mobile service provider and by a current mobile service provider;
sending, by the mobile service provider, a request to the blockchain ledger to update data of the current mobile service provider;
when a notification from the blockchain ledger indicating that a connection between the current mobile service provider and the mobile device is disconnected, porting a mobile number of the mobile device, by the mobile service provider; and
updating the porting data in the blockchain ledger.

17. The non-transitory computer readable medium of claim 16, further comprising instructions, that when read by a processor, cause the processor to retrieve from the blockchain ledger a pending service amount due to the current mobile provider from the mobile device.

18. The non-transitory computer readable medium of claim 17, further comprising instructions, that when read by a processor, cause the processor to clear the mobile device pending service amount with the current mobile service provider.

19. The non-transitory computer readable medium of claim 18, further comprising instructions, that when read by a processor, cause the processor to update the cleared pending service amount.

20. The non-transitory computer readable medium of claim 19 further comprising instructions to generate a bill including the cleared pending service amount for the mobile device.

* * * * *